(12) United States Patent  
Sakai (10) Patent No.: US 8,270,373 B2  
(45) Date of Patent: Sep. 18, 2012

(54) MOBILE WIRELESS TERMINAL, WIRELESS MODULE, HANDOVER METHOD, AND RECORDING MEDIUM

(75) Inventor: Hiroshi Sakai, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 385 days.

(21) Appl. No.: 12/558,701

(22) Filed: Sep. 14, 2009

(65) Prior Publication Data

US 2010/0080193 A1 Apr. 1, 2010

(30) Foreign Application Priority Data

Sep. 29, 2008 (JP) ................................. 2008-249563

(51) Int. Cl.
*H04W 4/00* (2009.01)
*H04W 36/00* (2009.01)

(52) U.S. Cl. ........ 370/332; 455/436; 455/437; 455/438; 455/439; 455/440; 455/441; 370/331; 370/333

(58) Field of Classification Search .................. 370/331, 370/332, 333; 455/436, 437, 438, 439, 440, 455/441

See application file for complete search history.

(56) References Cited

U.S. PATENT DOCUMENTS

| 7,065,353 | B1* | 6/2006 | Bolinth et al. | ............. 455/426.1 |
| 2004/0266434 | A1* | 12/2004 | Lehtinen et al. | ............. 455/436 |
| 2007/0217384 | A1* | 9/2007 | Mitani | ......................... 370/338 |
| 2007/0258407 | A1* | 11/2007 | Li et al. | ......................... 370/331 |
| 2008/0108367 | A1* | 5/2008 | Afrashteh et al. | ......... 455/452.2 |

FOREIGN PATENT DOCUMENTS

| JP | 2001112039 A | 4/2001 |
| JP | 2007251652 A | 9/2007 |

* cited by examiner

*Primary Examiner* — Ayaz Sheikh
*Assistant Examiner* — Tarell Hampton (57) ABSTRACT

Provided is a mobile wireless terminal connected to a base station via wireless, including: a storage section which stores and holds a plurality of handover execution threshold values used for execution of handover processing of changing connection in a wireless communication network; a service suspension period identifying section which identifies a service suspension period occurring at a time of the handover processing; a handover execution threshold value selecting section which selects, based on a value of the service suspension period identified by the service suspension period identifying section, one handover execution threshold value among the plurality of handover execution threshold values stored in the storage section; and a control section which executes the handover processing based on the one handover execution threshold value selected by the handover execution threshold value selecting section and a received radio signal.

16 Claims, 6 Drawing Sheets

FOR AUDIO COMMUNICATION SERVICE (REAL-TIME CHARACTERISTIC: HIGH)

| SERVICE SUSPENSION PERIOD | HANDOVER EXECUTION THRESHOLD VALUE | |
|---|---|---|
| | NUMBER OF PACKET ERRORS NUMBER OF CONTINUOUSLY LOST PACKETS/UNIT TIME | ELECTRIC FIELD STRENGTH |
| 50 ms OR SHORTER | 0 | -40dBm |
| 50 ~ 200ms | 0 | -50dBm |
| 200 ~ 500ms | 5 | -60dBm |
| 500 ms OR LONGER | 10 | -70dBm |

FIG. 3A

FOR DATA COMMUNICATION SERVICE (REAL-TIME CHARACTERISTIC: LOW)

| SERVICE SUSPENSION PERIOD | HANDOVER EXECUTION THRESHOLD VALUE | |
|---|---|---|
| | NUMBER OF PACKET ERRORS NUMBER OF CONTINUOUSLY LOST PACKETS/UNIT TIME | ELECTRIC FIELD STRENGTH |
| 0.5 s OR SHORTER | 0 | -50dBm |
| 0.5 ~ 2s | 5 | -60dBm |
| 2 ~ 5s | 10 | -70dBm |
| 5 s OR LONGER | 20 | -80dBm |

MOBILE WIRELESS TERMINAL, WIRELESS MODULE, HANDOVER METHOD, AND RECORDING MEDIUM

This application is based upon and claims the benefit of priority from Japanese patent application No. 2008-249563, filed on Sep. 29, 2008, the disclosure of which is incorporated herein in its entirety by reference.

BACKGROUND OF THE INVENTION

1. Field of the Invention

This invention relates to a mobile wireless terminal connected to a base station via wireless, and thereby capable of being connected to a communication network. More particularly, this invention relates to a mobile wireless terminal featured by a handover method of switching connection from one base station to another, a program used for a handover, and a handover method.

2. Description of the Related Art

A mobile terminal communication system of a cellular type requires handover processing (handoff processing) of changing from one base station to another without interruption of communications.

There have been proposed various methods as the handover processing. In each method, a mobile wireless terminal generally selects, with reference to a received electric field strength, a base station having a higher received electric field strength and performs communications with the selected base station. In this event, the mobile wireless terminal stores and holds therein an activation condition for the handover processing as a threshold value, and executes the handover processing when the received electric field strength decreases below the threshold value.

Figure 1:
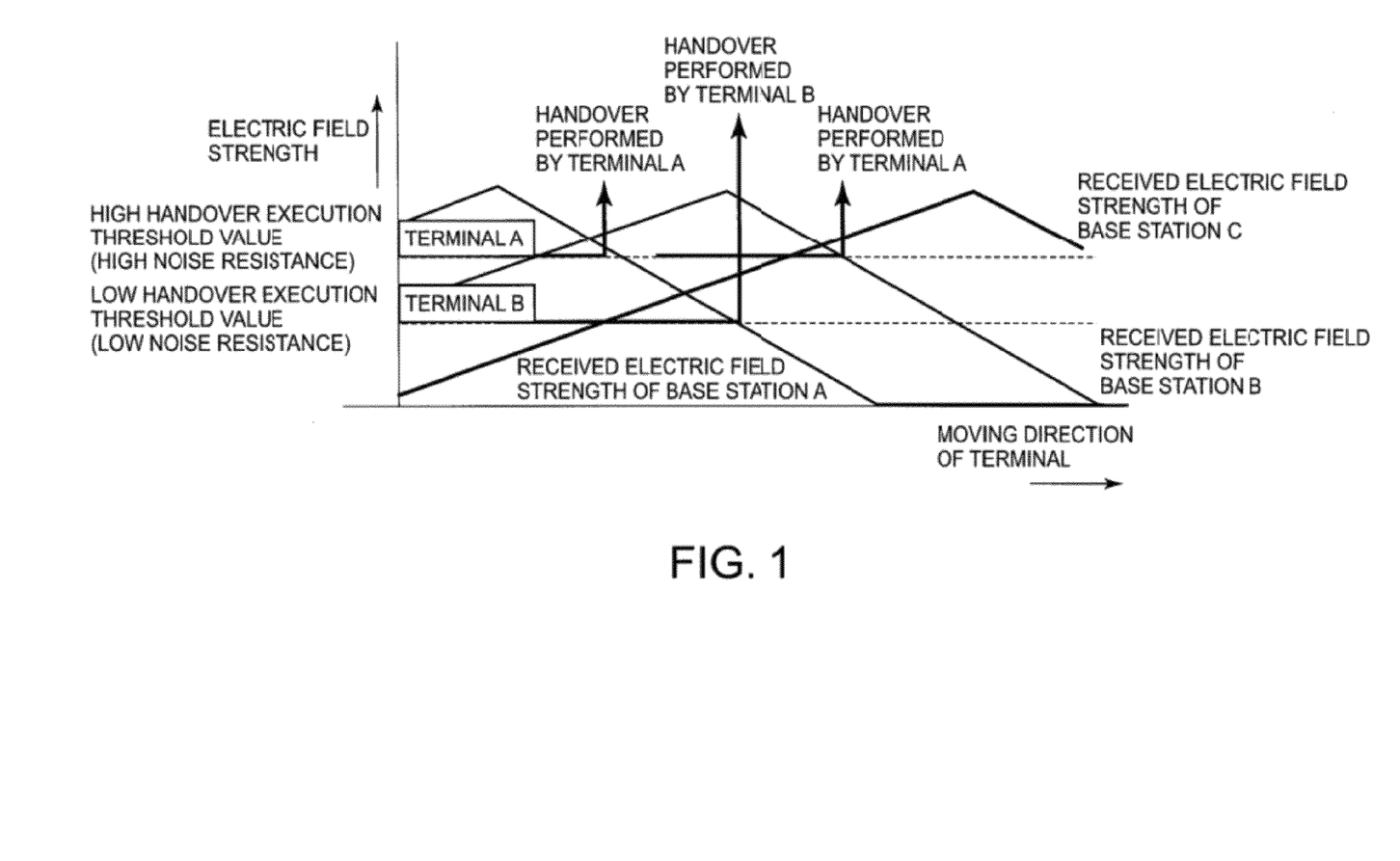
FIG. 1 is an explanatory diagram illustrating handover execution processing by means of a handover execution threshold value.

FIG. 1 is an explanatory diagram illustrating handover execution processing by means of a handover execution threshold value.

As illustrated in FIG. 1, the handover processing is executed by the mobile wireless terminal depending on a height of the handover execution threshold value. When the handover processing is executed at a high communication level (namely, a high threshold level), it is possible to increase resistance against noise. In this case, execution times of handover processing should be increased, as shown in FIG. 1.

On the other hand, when the handover processing is executed at a low communication level (namely, a low threshold level), the resistance against the noise becomes weak. In this case, execution times of the handover processing can be decreased.

The handover execution threshold value is usually determined on designing the mobile wireless terminal in consideration of services and standards to be applied.

As examples of the technology relating to the above-mentioned mobile terminal communication system of the cellular type, there are proposed technologies described in Japanese Unexamined Patent Application Publication (JP-A) No. 2001-112039 and Japanese Unexamined Patent Application Publication (JP-A) No. 2007-251652.

Specifically, Japanese Unexamined Patent Application Publication (JP-A) No. 2001-112039 describes a mobile wireless terminal which is selectively connected in time division multiplexing fashion via wireless to a plurality of base stations. In this event, each of the base stations can be connected to a network. Specifically, the mobile wireless terminal includes: electric field strength detecting means for detecting a received electric field strength of a radio signal transmitted from each of the plurality of base stations; and base station detecting means which is connected to the electric field strength detecting means to detect one of the base stations with reference to the received electric field strength of the each of the plurality of base stations. The base station detecting means selects, as the one of the base stations, a base station which tends to increase in a received electric field strength. In addition, handover control means is included in the mobile wireless terminal to preferentially wirelessly connect the base station detected by the base station detecting means, when a communication state of communications with a connected base station is degraded in comparison with a condition set in advance, instead of the connected base station.

Japanese Unexamined Patent Application Publication (JP-A) No. 2007-251652 describes a wireless LAN system which includes: a plurality of wireless LAN base stations; and a wireless LAN mobile station. Specifically, the wireless LAN mobile station includes: received field strength measuring means for measuring a value of a received field strength; and handover executing means for comparing the value of the received field strength measured by the received field strength measuring means with a threshold value serving as a criterion for executing a handover, to execute the handover when the value of the received field strength is judged to be equal to or smaller than the threshold value. Moreover, the wireless LAN mobile station further includes communication quality measuring means for measuring a communication quality of information that is transmitted and received between the wireless LAN mobile station and the wireless LAN base station associated with the wireless LAN mobile station; and threshold value changing means for increasing threshold value, when the communication quality measured by the communication quality measuring means is judged to be lower than a predetermined communication quality, the threshold value by a predetermined value.

In general, as in the case of the PHS system described in Japanese Unexamined Patent Application Publication (JP-A) No. 2001-112039, the handover is executed according to the preset received electric field strength and the error occurrence status, and hence, interruption (loss) of communications (packets) and a communication-disabled period in which communications are disabled may occur during execution of handover.

As a countermeasure against the interruption (loss) of communications (packets) that may occur during execution of the handover, as in the case of the wireless LAN system described in Japanese Unexamined Patent Application Publication (JP-A) No. 2007-251652, the interruption (loss) of communications (packets) that may occur during execution of the handover is suppressed by measuring the received field strength and the communication quality to properly change the threshold value based on the result of the measurement, and by executing the handover processing with a higher electric field strength and a higher communication quality.

Further, as another countermeasure thereagainst, the interruption (loss) of communications (packets) is suppressed by adopting a high-speed handover processing method to shorten a period necessary for the handover.

However, it is to be noted that handover processing may inevitably become unstable, when high-speed handover processing cannot be performed according to communication environment, or when a repetition of handover processing occurs in order to carry out handover processing under high field intensity and high communication quality.

SUMMARY OF THE INVENTION

In view of the above-mentioned cases, it is an object of this invention to provide a mobile wireless terminal and a wireless module that realize an optimal handover condition by identifying a state of a communication environment and based on a period necessary for handover processing.

It is another object of this invention to provide a handover method that realizes an optimal handover condition by identifying a state of a communication environment and based on a period necessary for handover processing.

A mobile wireless terminal connected to a base station via wireless according to this invention includes: a storage section storing a plurality of handover execution threshold values used for execution of handover processing of changing connection in a wireless communication network; a service suspension period identifying section identifying a service suspension period occurring at a time of the handover processing; a handover execution threshold value selecting section selecting, based on a value of the service suspension period identified by the service suspension period identifying section, one handover execution threshold value among the plurality of handover execution threshold values stored in the storage section; and a control section executing the handover processing based on the one handover execution threshold value selected by the handover execution threshold value selecting section and a received radio signal.

A wireless module for forming radio layer connection with a base station according to this invention includes: a service suspension period identifying section identifying a service suspension period occurring at a time of handover processing of changing connection in a wireless communication network; a handover execution threshold value selecting section selecting, based on a value of the service suspension period identified by the service suspension period identifying section, one handover execution threshold value among a plurality of handover execution threshold values used for execution of the handover processing; and a control section executing the handover processing based on the one handover execution threshold value selected by the handover execution threshold value selecting section and a received radio signal.

A handover method between a base station and a mobile wireless terminal according to this invention includes: identifying a service suspension period occurring during execution of handover processing of changing connection in a wireless communication network; selecting, based on the service suspension period, one handover execution threshold value among a plurality of handover execution threshold values used for execution of the handover processing; and executing the handover processing based on the selected one handover execution threshold value and a received radio signal.

A recording medium according to this invention has a program recorded thereon for causing a mobile wireless terminal, which is connected to a base station via wireless, to operate as: a service suspension period identifying section identifying a service suspension period occurring at a time of handover processing of changing connection in a wireless communication network; a handover execution threshold value selecting section selecting, based on a value of the service suspension period identified by the service suspension period identifying section, one handover execution threshold value among a plurality of handover execution threshold values used for execution of the handover processing; and a handover processing executing section executing the handover processing based on the one handover execution threshold value selected by the handover execution threshold value selecting section and a received radio signal.

DESCRIPTION OF THE EXEMPLARY EMBODIMENTS

An embodiment of this invention is described with reference to FIGS. 2 to 5. It should be noted that description of a configuration and operation which do not closely relate to this invention is omitted for simplification of the description.

Figure 2:
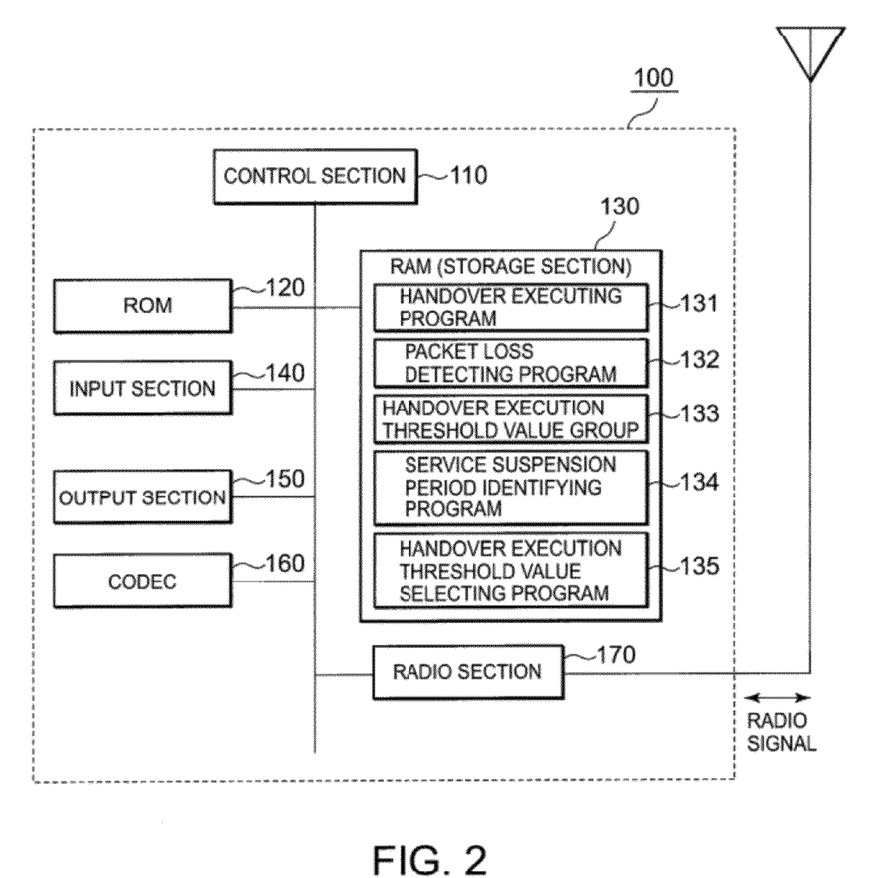
FIG. 2 is a block diagram illustrating a configuration of a mobile wireless terminal according to an embodiment of this invention.

FIG. 2 is a block diagram illustrating a configuration of a mobile wireless terminal 100 according to the embodiment of this invention.

The mobile wireless terminal 100 according to the embodiment of this invention includes a control section 110 for collectively controlling each component and executes handover processing, a ROM 120, a RAM 130, an input section 140 such as a keypad, an output section 150 that outputs a character, image, sound, vibration, and the like, a codec 160 that converts between analog data and digital data, and a radio section 170.

The RAM 130 stores various kinds of programs and data, such as an operating system program, a handover executing program 131, a packet loss detecting program 132 for detecting the number of lost packets based on a communication sequence number or the like, and a handover execution threshold value group 133 which is a group of a plurality of threshold values used for execution of handover processing. Those programs and data are used as occasion demands. The RAM 130 further stores a service suspension period identifying program 134 and a handover execution threshold value selecting program 135.

The handover executing program 131 and the packet loss detecting program 132 cause the control section 110 to operate as a handover executing section and a packet loss detecting section, respectively.

The service suspension period identifying program 134 causes the control section 110 to operate as a service suspension period identifying section for identifying a service suspension period occurring at the time of handover processing.

For example, a service suspension period may be identified by acquiring a period from a table having service suspension periods recorded in correspondence to predetermined services.

Further, the identifying processing may be performed by calculating a service suspension period based on a communication speed and the number of communication sequences necessary for handover processing.

Further, the identifying processing may be performed by calculating a service suspension period necessary for handover processing with reference to a communication speed and the number of lost packets detected using the packet loss detecting program 132.

Further, the identifying processing may be performed by a service suspension period based on a previous service suspension period of a previous handover processing.

The handover execution threshold value selecting program 135 causes the control section 110 to operate as a handover execution threshold value selecting section, and selects one handover execution threshold value from the handover execution threshold value group 133 based on the service suspension period identified by the service suspension period identifying section.

The radio section 170 includes an up/down-converter, a detector, a demodulator circuit, and a baseband circuit. The radio section 170 transmits and receives a radio signal and enables radio layer connection with a base station.

Figure 3A:
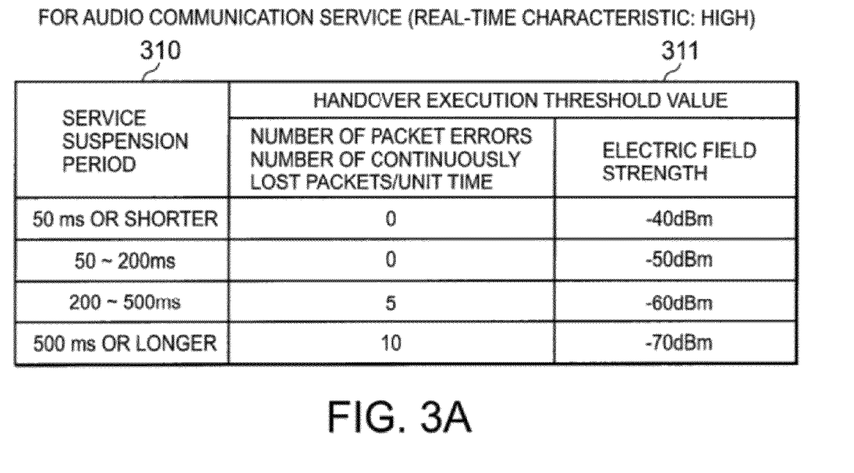
FIG. 3A is a table each visualizing an example of the handover execution threshold value for an audio communication service, which is used for the mobile wireless terminal according to the embodiment of this invention.

FIG. 3A is a table visualizing an example of a handover execution threshold value for an audio communication service, which is used for the mobile wireless terminal 100 according to the embodiment of this invention.

As illustrated in the example of FIG. 3A, handover execution threshold values 311 are set in association with service suspension periods 310.

As described above, by setting a plurality of threshold values in association with the service suspension periods 310, the mobile wireless terminal 100 can select, by means of the service suspension period identifying section, one handover execution threshold value among the plurality of visualized handover execution threshold values during audio communication connection.

As a specific example, in a case where the service suspension period is equal to or shorter than 50 ms, the mobile wireless terminal 100 executes handover processing when the number of continuous packet errors per unit time is zero and the electric field strength is equal to or lower than −40 dB. This shows that no handover processing may be executed when electric field strength is higher than −40 dB.

Specifically, in a case of a short service suspension period and the communication quality kept at the electric field strength not higher than −40 dB, the mobile wireless terminal 100 executes handover processing at the time when the electric field strength is slightly degraded (equal to or lower than −40 dB).

As another example, in a case where the service suspension period ranges from 50 ms to 200 ms, the mobile wireless terminal 100 executes handover processing also when the number of continuous packet errors per unit time is zero and the electric field strength is equal to or lower than −50 dB.

That is, in the case where the service suspension period moderately becomes long (namely, 50 ms to 200 ms), the mobile wireless terminal 100 also executes handover processing at the time when the electric field strength is degraded to a range equal to or lower than −50 dB, in comparison with the case of the short service suspension period (equal to or shorter than 50 ms).

In other words, in the case where the service suspension period moderately becomes long as compared with the case of the short service suspension period, the handover is not executed during a time when electric field strength is degraded (−40 dB to −50 dB), thereby decreasing the number of handovers.

As another example, in a case where the service suspension period is equal to or longer than 500 ms, the mobile wireless terminal 100 executes handover processing when the number of continuous packet errors per unit time is 10 and the electric field strength is equal to or lower than −70 dB.

That is, in a case of a long service suspension period (equal to or longer than 500 ms), the mobile wireless terminal 100 executes handover processing at the time when the electric field strength is so degraded as to approach the limit (equal to or lower than −70 dB), compared with the case of the short service suspension period (equal to or shorter than 50 ms).

In other words, compared with the case of the short service suspension period, in the case of the long service suspension period, there is provided a duration in which the handover is not executed even when the electric field strength is degraded, thereby decreasing the number of handovers. The duration is set according to the service suspension period occurring at the time of the handover, in consideration of inconvenience felt by a person who uses the service.

In other words, in the case of the audio communication service, when the service suspension period is as short as the period in which the user can not recognize the interruption of audio, communications are performed preferentially with a base station having a better electric field strength without considering the increase in number of handovers.

Further, when the service suspension period is as long as the period in which the user can recognize the interruption of audio to some extent, the handover execution threshold value is decreased so that the number of handovers is decreased, and hence quality of communications on the phone is improved.

Further, when the service suspension period is as long as the period in which the user may surely recognize the interruption of audio, the handover execution threshold value is further decreased so that the handover is not executed until communications connection on the phone are on the verge of interruption, and the handover processing is executed immediately before the communications are interrupted. Accordingly, the quality of communications on the phone is improved for the user.

With this configuration, the mobile wireless terminal 100 according to the embodiment of this invention can realize an optimal handover condition by identifying the state of the communication environment and based on the period necessary for the handover processing.

Figure 3B:
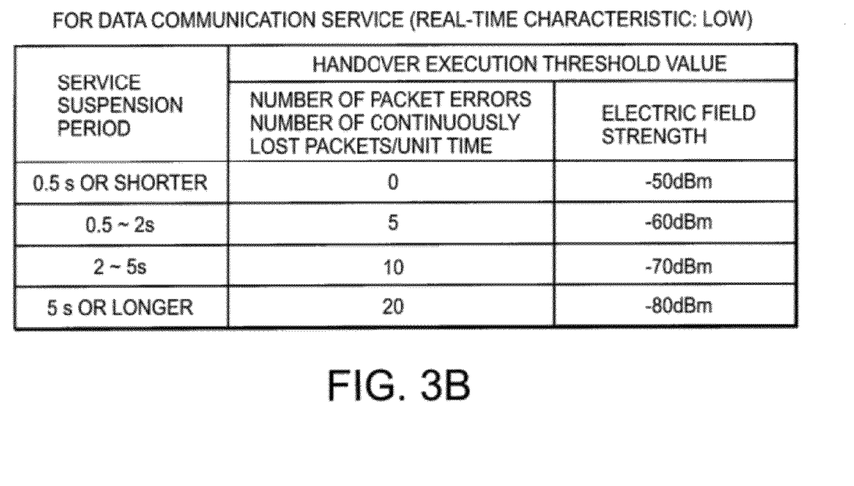
FIG. 3B is a table each visualizing an example of the handover execution threshold value for a data communication service, which is used for the mobile wireless terminal according to the embodiment of this invention.

FIG. 3B is a table visualizing an example of a handover execution threshold value for a data communication service, which is used for the mobile wireless terminal 100 according to the embodiment of this invention.

It is to be noted that, while data communications are performed, real-time requirements for the data communications is comparatively low as compared with audio communications. Instead, the data communications require to preferentially keep communication connection and to desirably expand its coverage. Specifically, by using such a handover condition as illustrated in FIG. 3B, an optimal handover condition can be provided.

Hereinafter, an operation of the mobile wireless terminal 100 is described. It should be noted that description of an operation of communications which has little relevance to the handover processing is omitted for simplification of the description.

Figure 4:
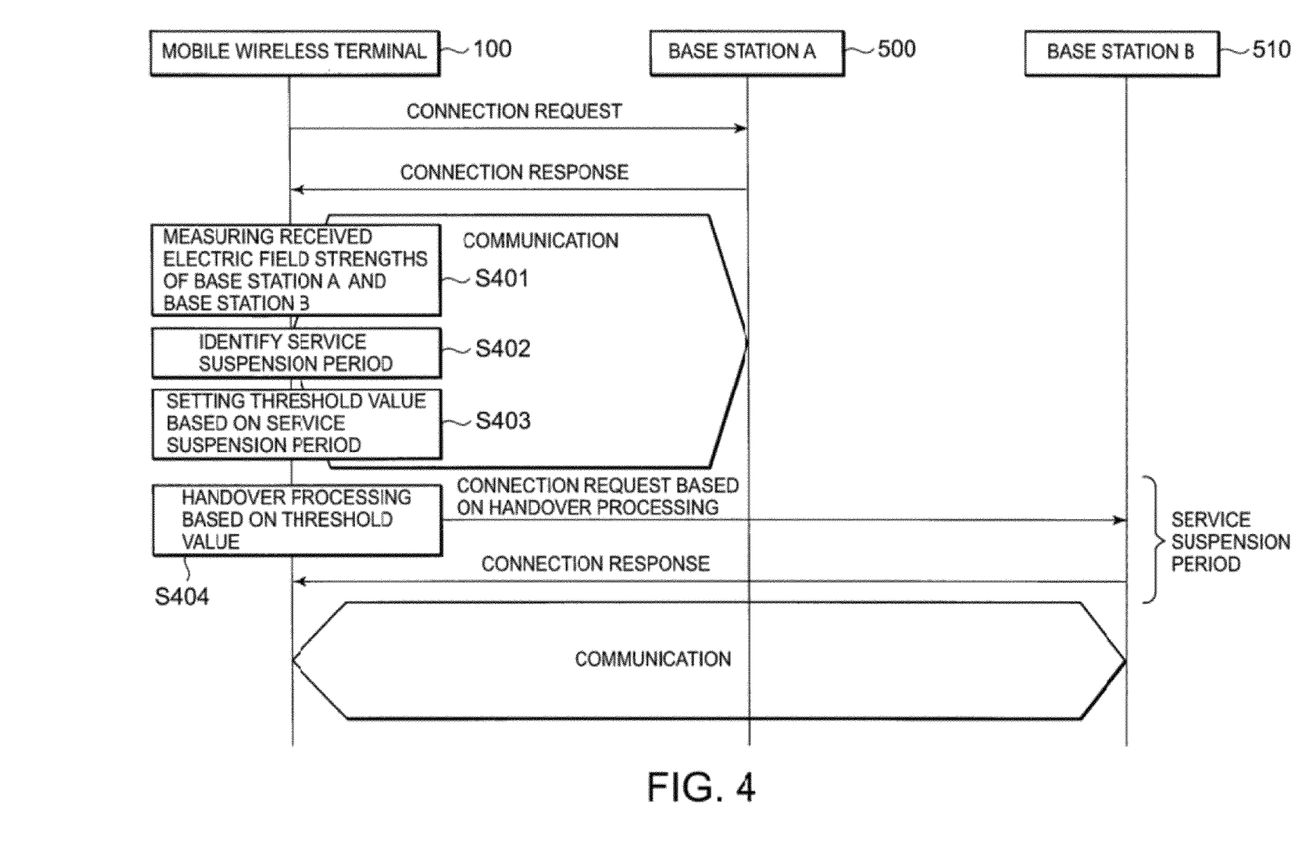
FIG. 4 is a sequence diagram illustrating handover processing executed in a mobile terminal communication system.

FIG. 4 is a sequence diagram illustrating the handover processing executed in the mobile terminal communication system. FIG. 4 illustrates a case where the mobile wireless terminal 100 communicating with a base station A 500 executes the handover to a base station B 510.

During communication with the base station A 500, the mobile wireless terminal 100 are measuring received electric field strengths of communication signals exchanged with the base station A 500 and neighboring base stations (including the base station B 510) with which the mobile wireless terminal 100 may perform communications (Step S401).

The mobile wireless terminal 100 identifies a service suspension period occurring at the time of the handover processing (to each base station) (Step S402).

The mobile wireless terminal 100 selects one handover execution threshold value from the handover execution threshold value group 133 stored in the storage section, based on the specified service suspension period (Step S403).

The mobile wireless terminal 100 compares the selected handover execution threshold value with the received electric field strength of the base station A 500, and executes the handover processing (Step S404).

The mobile wireless terminal 100 establishes communications with the base station B 510. By executing the handover as described above, it is possible to change the communication destination from one base station to another without interrupting the service provided to the user.

Figure 5:
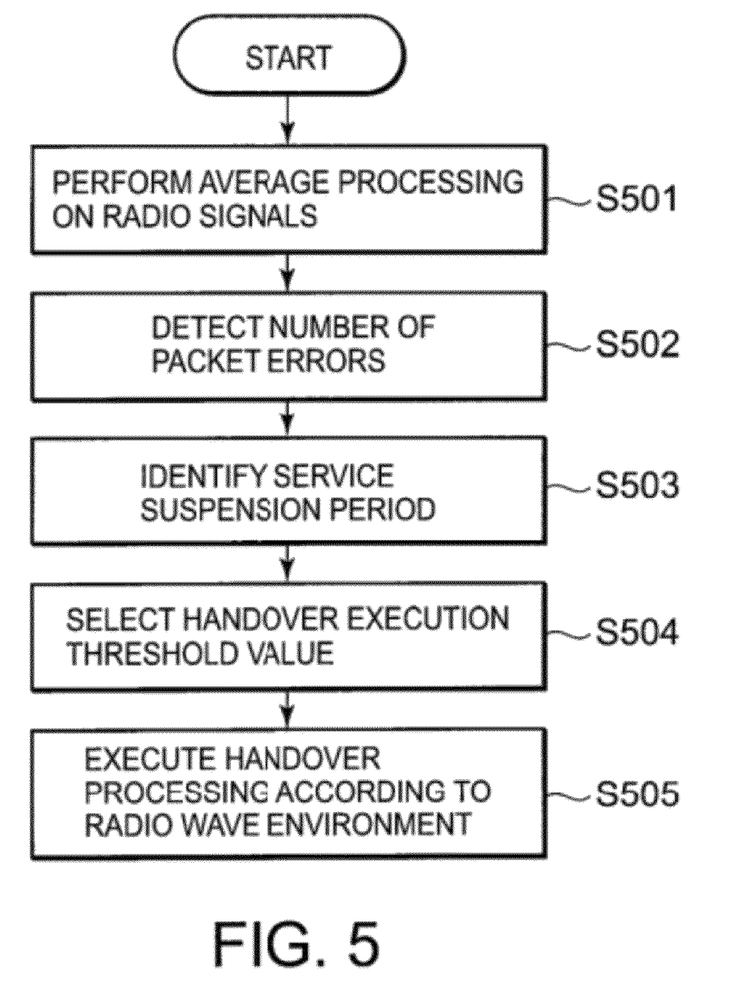
FIG. 5 is a flow chart illustrating operation of the handover processing executed by the mobile wireless terminal.

FIG. 5 is a flow chart illustrating an example of the operation of the handover processing executed by the mobile wireless terminal 100. It should be noted that description is made in detail based on the description with reference to the sequence diagram.

During communication with the base station, the mobile wireless terminal 100 is measuring received electric field strengths of communication signals to be exchanged with the neighboring base stations (base stations to which connection is to be handed over) with which the mobile wireless terminal 100 may perform communications. The control section 110 of the mobile wireless terminal 100 uses hardware and/or software to perform average processing on the radio signals from the base stations, which are received from the radio section 170 (Step S501).

The average processing is performed in order to make it possible to alleviate fluctuations by averaging the detected input signals. An average processing section that performs the average processing on the received signals from the base stations can measure stable electric field strengths with smaller fluctuations of the detected values of the electric field strengths, by providing, if the average processing section is implemented by using hardware, an average filter or an operator as necessary to the radio section 170. If the average processing section is implemented by using software, the control section 110 may be caused to average the electric field strengths of the radio signals acquired by the radio section 170.

Further, in measuring the electric field strength for activating the handover processing, an instantaneous electric field variation due to the normal modulation scheme or an electric field variation due to fading occurs. The variation makes the handover processing unstable, and therefore the average processing section is added to realize stable operation thereof. There may be a case where immediate judgment is necessary, such as a case of an antenna diversity, and hence it is desirable that a period for performing the average processing be set as necessary in the average processing performed by the average processing section.

The control section 110 uses the packet loss detecting section to identify the number of packet errors (Step S502).

The control section 110 identifies the service suspension period occurring at the time of the handover processing (Step S503). The control section 110 selects one handover execution threshold value from the handover execution threshold value group 133 stored in the RAM 130 based on the specified service suspension period and number of packet errors (Step S504). It should be noted that the handover execution threshold value may be set based on a value indicating communication quality other than the number of packet errors (such as radio error rate) along with the service suspension period. In this case, the handover can be executed with higher accuracy as compared with the case of using the service suspension period alone.

The control section 110 compares the selected handover execution threshold value with the received electric field strength of the base station whose connection is to be handed over, and determines whether or not the handover processing is to be executed (Step S505).

As described above, according to the embodiment of this invention, it is possible to provide the mobile wireless terminal that realizes the optimal handover condition by identifying the state of the communication environment and based on the period necessary for the handover processing.

Figure 6:
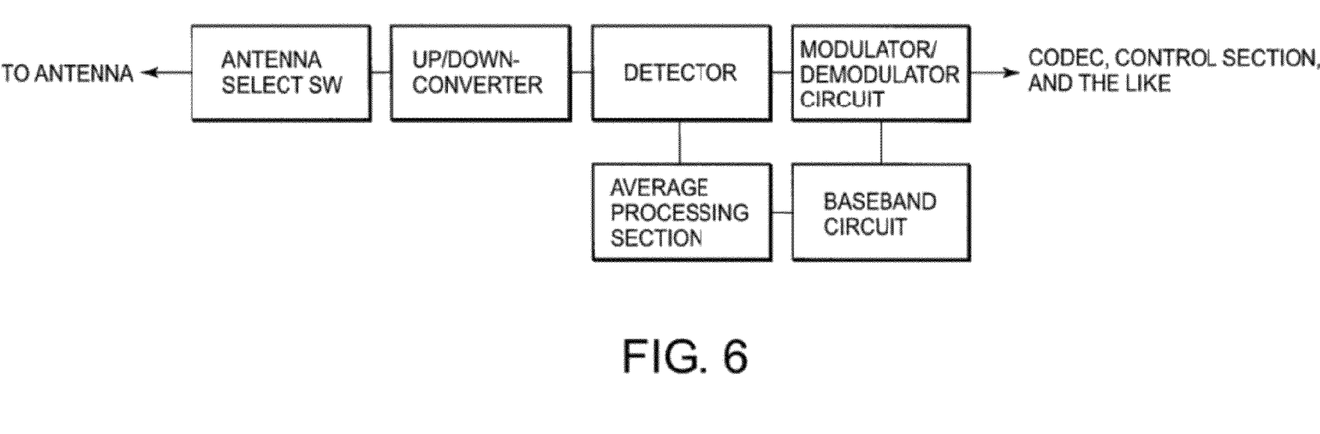
FIG. 6 is a diagram illustrating an example of a position at which an average processing section is disposed in a case where functions of the mobile wireless terminal are implemented by a wireless module.

The above-mentioned embodiment has been described focusing on the mobile wireless terminal operating based on the programs. Alternatively, each component may be implemented by using hardware, and a part or all of the functions implemented by the programs may be substituted with those implemented by the hardware, thereby providing a wireless module. In this case, the wireless module responsible for the radio layer connection may be provided with the service suspension period identifying section for identifying the service suspension period occurring at the time of the handover processing, the handover execution threshold value selecting section for selecting one handover execution threshold value from among the plurality of handover execution threshold values based on the value calculated by the service suspension period identifying section, and the control section which executes the handover processing based on the selected handover execution threshold value and the received radio signals. In addition, the average processing section that performs the average processing on the received signals from the base stations is desirably provided to the wireless module. Further, the handover processing may be executed by acquiring the number of packet errors or radio error rate of the received radio signals. It becomes more effective when a plurality of handover execution threshold values are set for each type of the service (such as audio service or data communication service). It should be noted that the average processing section is desirably disposed at a position illustrated in FIG. 6.

The respective programs used for the handover processing may be provided to the mobile wireless terminal or the like by being recorded on a recording medium or via a communication network.

As described above, according to this invention, it is possible to provide the mobile wireless terminal, the wireless module, and the recording medium having programs recorded thereon that realize the optimal handover condition by identifying the state of the communication environment and based on the period necessary for the handover processing.

Similarly, according to this invention, it is possible to provide the handover method that realizes the optimal handover condition by identifying the state of the communication environment and based on the period necessary for the handover processing.

This invention is not limited to the above-mentioned embodiment, and may be modified as appropriate without departing from the gist of this invention. In other words, various modifications which can be understood by a person skilled in the art may be made on the configuration and operation of this invention within the scope of claims of this invention. This invention may be applied to a wireless communication network of a cellular type. Specifically, this invention may be applied to handover processing for a terminal in a PHS system or a W-LAN system.

What is claimed is:

1. A mobile wireless terminal connected to a base station via wireless, comprising:
    a storage section storing a plurality of handover execution threshold values used for execution of handover processing of changing connection in a wireless communication network;
    a service suspension period identifying section identifying a service suspension period occurring at a time of the handover processing;
    a handover execution threshold value selecting section selecting, based on a value of the service suspension period identified by the service suspension period identifying section, one handover execution threshold value among the plurality of handover execution threshold values stored in the storage section; and
    a control section executing the handover processing based on the one handover execution threshold value selected by the handover execution threshold value selecting section and a received radio signal,
    wherein the service suspension period identifying section identifies the service suspension period by calculating the service suspension period occurring at the time of the handover processing based on a communication speed and a number of lost packets.

2. A mobile wireless terminal according to claim 1, further comprising an average processing section averaging the radio signal received from the base station.

3. A mobile wireless terminal according to claim 1, wherein the control section executes the handover processing with reference to the calculated service suspension period.

4. A mobile wireless terminal according to claim 1, wherein the plurality of handover execution threshold values are set for types of services, respectively.

5. A mobile wireless terminal according to claim 1, wherein the plurality of handover execution threshold values are set for each of an audio service and/or a data communication service.

6. A wireless module for forming radio layer connection with a base station, comprising:
    a service suspension period identifying section identifying a service suspension period occurring at a time of handover processing of changing connection in a wireless communication network;
    a handover execution threshold value selecting section selecting, based on a value of the service suspension period identified by the service suspension period identifying section, one handover execution threshold value among a plurality of handover execution threshold values used for execution of the handover processing; and
    a control section executing the handover processing based on the one handover execution threshold value selected by the handover execution threshold value selecting section and a received radio signal,
    wherein the service suspension period identifying section identifies the service suspension period by calculating the service suspension period occurring at the time of the handover processing based on a communication speed and a number of lost packets.

7. A wireless module according to claim 6, further comprising an average processing section averaging the radio signal received from the base station.

8. A wireless module according to claim 6, wherein the control section executes the handover processing with reference to the calculated service suspension period.

9. A wireless module according to claim 6, wherein the plurality of handover execution threshold values are set for types of services.

10. A handover method between a base station and a mobile wireless terminal, comprising:
    identifying a service suspension period occurring during execution of handover processing of changing connection in a wireless communication network;
    selecting, based on the service suspension period, one handover execution threshold value among a plurality of handover execution threshold values used for execution of the handover processing; and
    executing the handover processing based on the selected one handover execution threshold value and a received radio signal,
    wherein the service suspension period is identified by calculating the service suspension period occurring at the time of the handover processing based on a communication speed and a number of lost packets.

11. A handover method according to claim 10, wherein:
    the selecting the one handover execution threshold value comprises selecting, from a group of the plurality of handover execution threshold values used for the execution of the handover processing, based on the identified service suspension period, one of a first handover execution threshold value which is to be selected when the service suspension period is equal to or shorter than a first predetermined value, and a second handover execution threshold value which is to be selected when the service suspension period is longer than the first predetermined value in comparison with the first handover execution threshold value, the second handover execution threshold value having a value of a received electric field strength smaller than a value of the received electric field strength of the first handover execution threshold value; and
    the executing the handover processing is performed based on the selected one of the first handover execution threshold value and the second handover execution threshold value, and the received radio signal.

12. A handover method according to claim 10, further comprising averaging the radio signal received from the base station to use the radio signal averaged in the handover processing.

13. A handover method according to claim 10, wherein the plurality of handover execution threshold values are set for types of services.

14. A non-transitory recording medium having a program recorded thereon for causing one of a mobile wireless terminal and a wireless module, which is connected to a base station via wireless, to operate as:
    a service suspension period identifying section identifying a service suspension period occurring at a time of handover processing of changing connection in a wireless communication network;

a handover execution threshold value selecting section selecting, based on a value of the service suspension period identified by the service suspension period identifying section, one handover execution threshold value among a plurality of handover execution threshold values used for execution of the handover processing; and a handover processing executing section executing the handover processing based on the one handover execution threshold value selected by the handover execution threshold value selecting section and a received radio signal, wherein the service suspension period identifying section identifies the service suspension period by calculating the service suspension period occurring at the time of the handover processing based on a communication speed and a number of lost packets.

15. The non-transitory recording medium having a program recorded thereon according to claim 14, the program further causing the one of the mobile wireless terminal and the wireless module to operate as an average processing section for averaging the radio signal received from the base station.

16. The non-transitory recording medium having a program recorded thereon according to claim 14, wherein the handover processing executing section executes the handover processing with reference to the calculated service suspension period.

* * * * *